Patented June 10, 1924.

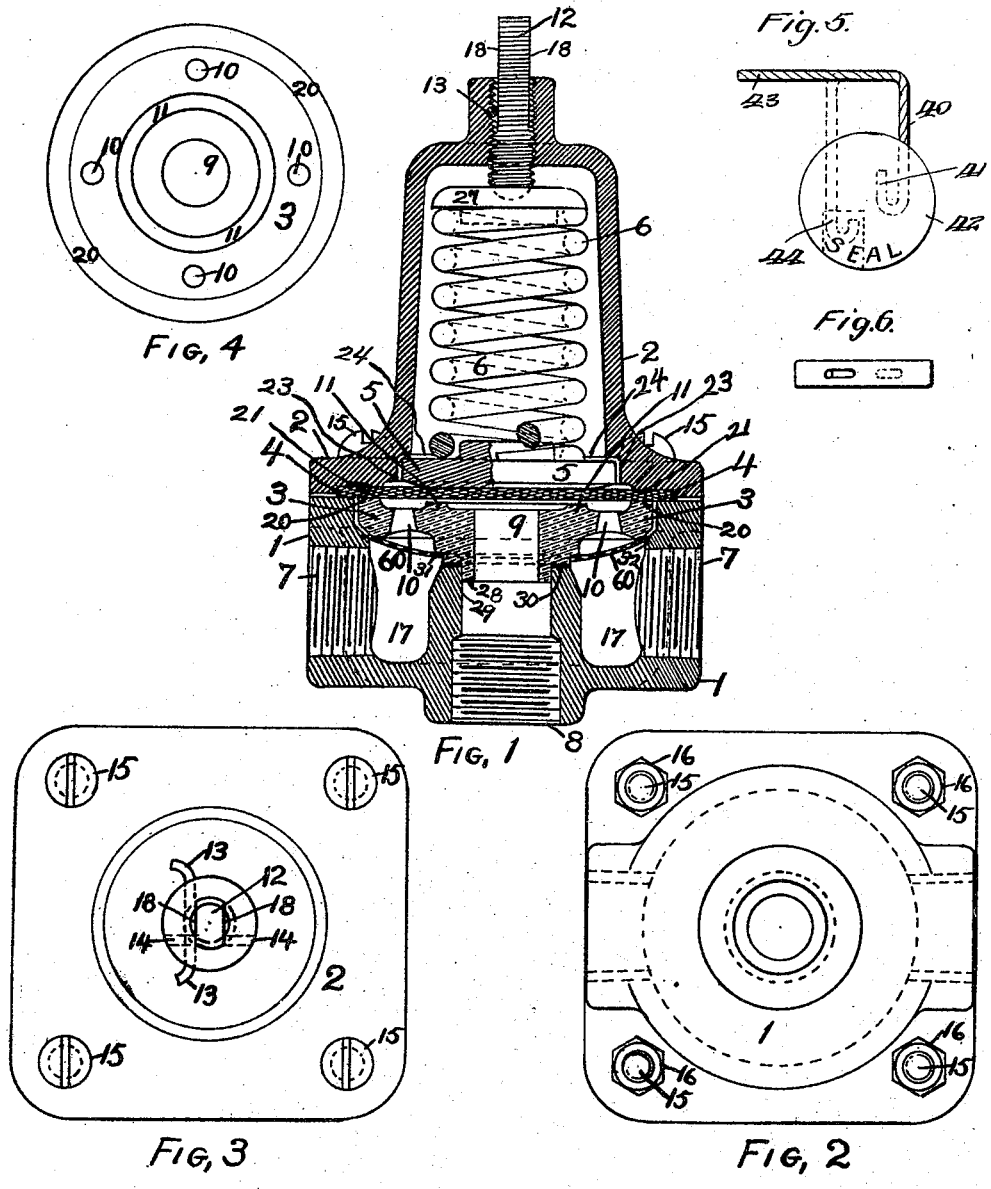

1,496,935

UNITED STATES PATENT OFFICE.

ELMER F. LEMMON, OF DECATUR, ILLINOIS.

PRESSURE-RELIEF VALVE.

Application filed February 13, 1922. Serial No. 536,234.

*To all whom it may concern:*

Be it known that I, ELMER F. LEMMON, a citizen of the United States, residing in the city of Decatur, county of Macon, and State of Illinois, have invented a new and useful Improvement in Pressure-Relief Valves, of which the following is a specification.

My invention relates particularly to a class of devices commonly used on pipes or conduits to relieve excessive pressure which may at times attain on fluids therein, which devices are commonly known as relief valves.

The objects of the invention are first to provide a valve of simple effective construction, accurate and reliable in operation, quick and inexpensive renewability of seating parts which are subject to wear due to the nature of service required, second to protect the seating parts from injury and obstruction from scale, grit, and other foreign substances very commonly present in all pipes or conduits and reservoirs in which fluids are confined or flow, third to provide a convenient method of adjustment for predetermined pressure, to lock the adjustment against unintentional change and to prevent any intentional change without leaving indication or evidence of such change.

In the accomplishment of the several objects set forth I have constructed a valve as shown in the drawings herewith in which, Figure 1 is a vertical central sectional view.

Figure 2 is a plan view looking from below.

Figure 3 is a plan view looking from above and showing pressure adjusting screw having flattened sides for convenience in applying wrench and also for abutment against locking pin, and by means of which adjusting screw may be readily sealed to provide against unauthorized changes or tampering.

Figure 4 is a top plan view of my renewable seating portion and strainer support.

Figure 5 is a plan view, and Figure 6 an elevation of a common well known form of stranded wire and lead body seal. Stranded wire 40 has its curved end 41, permanently molded and fixed in body 42, and the opposite end 43, after having been passed through the hole in substitution for locking pin 13, Figure 3, may then readily be bent and passed through seal body 42, as indicated by dotted lines at 44, after which the yielding seal body is crushed down on wire 40, with a suitable imprint so that end 43 can not be removed without defacement of the imprint on seal body.

Indicating numerals refer to the same parts throughout the several figures.

Numeral 1 indicates the body casing member. Numeral 2 indicates the spring chamber member. Numeral 3 indicates the seating member adapted to be firmly and imperviously held in its fixed position just beneath diaphragm member 4 whose periphery is tightly clamped between outer flanges of body member 1 and spring chamber member 2 forming an impervious joint therebetween and also serving to hold seat member 3 fixedly in position by reason of the inner portion of spring chamber flange at 21 overlying outer flange portion 20 of seat member 3. Seat member 3 has a central lower projecting portion 28 resting within upwardly projecting bore 29 of body member 1 the joint between the two members being made impervious by annular packing washer 30.

Pressure plate 5 normally lies within annular recess 23 of member 2 and is limited as against upward movement by shoulder 24.

Spring 6 is surmounted by cap 27 through which by means of adjusting screw 12, spring 6 is forced downward on pressure plate 5 against upper surface of flexible diaphragm 4 with a predetermined amount of load and in the absence of a sufficient amount of counteracting pressure on under side of diaphragm 4, the latter is forced downward to form an impervious closure against annular seating surface 11 of member 3.

Two screw threaded openings 7—7 on opposite sides of body member 1 are provided for mounting the valve on a straight way line of pipe if so desired, or it may be mounted on the pipe by connecting at one side only, the opposite opening being provided with a screw threaded plug, in either case the outlet for excess pressure is at lower central threaded outlet 8 to which a discharge pipe may be connected when so desired.

Whether mounted on a straight way pipe with normal pressure of fluid flowing through the body member 17 or on a pipe connecting at one side only and opposite side plugged, diaphraghm 4 forming tight closure against seat 11 prevents flow from chamber 17 into central port 9 and out through opening 8 until such time as the pressure exceeds the amount for which diaphragm 4 has been predeterminately loaded, beyond which point the excess pressure will force diaphragm 4 upward and escape through central port 9 out through opening or connecting pipe at 8.

Combined seat and strainer support member 3 has a plurality of restricted ports 10 whose combined area is less than area of central outlet port 9 the effect of these restricted ports being to more quickly relieve pressure under diaphragm 4 after it has been lifted by excess pressure from seat 11 producing what is commonly known as a "pop" effect to cause quicker and more positive reseating of diaphragm 4 on seat 11 after excess pressure has been released.

Circular strainer member 60 of suitable mesh wire screen lies against under side of seat member 3 and is held against being forced upward by reason of inner shoulder 31 and underside of outer flange 20 while inner annular shoulder 32 of body member 1 prevents it from moving downward.

The function of strainer member 3 is to prevent scale, grit or other foreign substances from obstructing or injuring seat 11 or preventing its tight closure.

Spring chamber casing 2 has an upward extended screw threaded portion to receive adjusting screw 12 which may have one or two flattened sides as at 18, against which locking pin 13 rests to prevent unintentional changing of adjustment of the screw. A crosswise hole 14 is also provided to receive locking pin 13 in case one quarter turn only of screw is required to secure the necessary adjustment for desired relief pressure.

It is manifest that ends of locking pin 13 may be extended a sufficient length to be secured within a seal of any suitable construction to prevent withdrawal of said extended ends without destroying or mutilating the seal thereby leaving evidence of locking pin or adjusting screw having been changed from its sealed adjustment.

Having shown and described construction and operation of my improvement in pressure relief valves, I claim:

1. In a pressure relief valve, the combination of a body casing member having one or more inlet ports and one outlet port, a spring chamber casing member, a flexible diaphragm member adapted to be clamped at its periphery between the body casing member and spring chamber casing member forming an impervious joint therebetween, a separable combined seat and strainer supporting member adapted to be imperviously held in central abutment with said body casing member by means of said diaphragm underlying an inner portion of a flange on said spring chamber casing member, adjustable means in said spring chamber casing member for imposing a predetermined load on said flexible diaphragm whereby it will form impervious closure on the seating portion of said combined seat and strainer support member to prevent flow or passage of fluid from said inlet port or ports into said outlet port of said body casing member.

2. In a pressure relief valve, the combination of a body casing member having one or more inlet ports and one outlet port, a spring chamber casing member, a flexible diaphragm member adapted to be clamped at its periphery between the body casing member and spring chamber casing member forming an impervious joint therebetween, a separable combined seat and strainer supporting member adapted to be imperviously held in central abutment with said body casing member by means of said diaphragm underlying an inner portion of a flange on said spring chamber casing member, adjustable means in said spring chamber casing member for imposing a predetermined load on said flexible diaphragm whereby it will form impervious closure on the seating portion of said combined seat and strainer support member to prevent flow or passage of fluid from said inlet port or ports into said outlet port of said body casing member, a strainer element supported and retained by said combined seat and strainer support member whereby the seating portion will be protected from obstruction and injury by foreign matter entrained with the fluid.

3. In a diaphragm relief valve the combination of a chambered inlet body casing member, a diaphragm casing member, adapted to be clamped against said chambered body casing member with a flexible diaphragm member forming an impervious joint therebetween, a separable renewable seat member having a plurality of restricted ports held in place and sealed around an outer flange thereof by said diaphragm member in such manner that all fluid must flow through said restricted ports before coming in contact with said diaphragm.

4. In a pressure relief valve, the combination of a body casing member having one or more inlet ports and one outlet port, a spring chamber casing member, a flexible diaphragm member adapted to be clamped at its periphery between the body casing member and spring chamber casing member forming an impervious joint therebetween, a separable combined seat and strainer supporting member adapted to be imperviously held in central abutment with said body casing member by means of said diaphragm underlying an inner portion of a flange on said spring chamber casing member, adjustable means in said spring chamber casing member for imposing a predetermined load on said flexible diaphragm whereby it will form impervious closure on the seating portion of said combined seat and strainer support member to prevent flow or passage of fluid from said inlet port or ports into said outlet port of said body casing member, means accessible from the outside of said spring chamber casing portion to lock and prevent unintentional change of adjustment of said loading means on said diaphragm together with sealing means to prevent intentional change of such adjustment without leaving evidence thereof.

ELMER F. LEMMON.

Witnesses:
 Geo. B. Madden,
 H. L. Catlin.